United States Patent
Jules et al.

(10) Patent No.: US 9,910,761 B1
(45) Date of Patent: Mar. 6, 2018

(54) VISUALLY DEBUGGING ROBOTIC PROCESSES

(71) Applicant: X Development LLC, Mountain View, CA (US)

(72) Inventors: Anthony Sean Jules, Oakland, CA (US); Johan Ulrich Lewin Jessen, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 239 days.

(21) Appl. No.: 14/752,998

(22) Filed: Jun. 28, 2015

(51) Int. Cl.
*G06F 9/44* (2006.01)
*G06F 11/36* (2006.01)

(52) U.S. Cl.
CPC ............ *G06F 11/3664* (2013.01); *G06F 8/34* (2013.01)

(58) Field of Classification Search
CPC ........................................................ G06F 9/44
USPC ................................................ 717/125–135
See application file for complete search history.

(56) References Cited

U.S. PATENT DOCUMENTS

| | | | | |
|---|---|---|---|---|
| 4,852,047 A | * | 7/1989 | Lavallee | G05B 19/058 700/86 |
| 6,374,155 B1 | | 4/2002 | Wallach et al. | |
| 6,445,964 B1 | * | 9/2002 | White | B25J 9/1689 700/253 |
| 6,954,728 B1 | * | 10/2005 | Kusumoto | G06Q 30/02 705/14.12 |
| 7,302,676 B2 | | 11/2007 | Schmitt et al. | |
| 7,975,179 B2 | * | 7/2011 | Chandrasekaran | G06F 11/3688 714/37 |
| 8,364,309 B1 | | 1/2013 | Bailey | |
| 8,666,548 B2 | | 3/2014 | Lim | |
| 8,843,235 B2 | | 9/2014 | Ota et al. | |
| 8,954,853 B2 | | 2/2015 | Lacaze et al. | |
| 2007/0156286 A1 | * | 7/2007 | Yamauchi | G05D 1/0038 700/245 |

(Continued)

FOREIGN PATENT DOCUMENTS

WO     2007113112     10/2007

OTHER PUBLICATIONS

Graphical User Interface http://simspark.sourceforge.net/wiki/index.php/Graphical_User_Interface; last accessed Apr. 22, 2015.

*Primary Examiner* — Jae Jeon
(74) *Attorney, Agent, or Firm* — Middleton Reutlinger

(57) ABSTRACT

Methods, apparatus, systems, and computer-readable media are provided for visually debugging robotic processes. In various implementations, a graphical user interface may be rendered that includes a flowchart representing a robotic process. A plurality of different logical paths through the robotic process may be represented by a plurality of different visible paths through the flowchart. In various implementations, robot operation data indicative of one or more implementations of the robotic process may be determined. Based on the robot operation data, a first logical path through the robotic process that satisfies a criterion may be identified. In various implementations, a first visual path through the flowchart may be selected that corresponds to the identified first logical path. In various implementations, the first visible path through the flowchart may be visually distinguished from a second visible path through the flowchart.

14 Claims, 9 Drawing Sheets

(56) References Cited

U.S. PATENT DOCUMENTS

| | | | |
|---|---|---|---|
| 2007/0234305 A1* | 10/2007 | Mishra | G06F 8/43 717/128 |
| 2008/0168428 A1* | 7/2008 | Bates | G06F 11/3612 717/129 |
| 2008/0282235 A1* | 11/2008 | Jadhav | G06F 11/3676 717/131 |
| 2010/0241289 A1 | 9/2010 | Sandberg | |
| 2011/0004481 A1* | 1/2011 | Jones | G06F 3/011 705/1.1 |
| 2011/0087371 A1 | 4/2011 | Sandberg et al. | |
| 2013/0218340 A1 | 8/2013 | Hager et al. | |
| 2014/0351243 A1* | 11/2014 | Error | G06F 11/323 707/722 |

\* cited by examiner

VISUALLY DEBUGGING ROBOTIC PROCESSES

BACKGROUND

Robotic processes may be created and implemented by robots to perform one or more tasks. For example, one robotic process may be implemented by a manufacturing robot to perform one or more steps of an assembly line process. Another robot process may be implemented by an autonomous or semi-autonomous robot to perform a variety of tasks within an environment in response to various triggers. Robotic processes may include one or more logical paths that may be traversed (or "followed") by a robot depending on various circumstances. For example, a first logical path of a robot process may be followed by a robot if a first condition is met, and a second logical path of the robot process may be followed by the robot if a second condition is met. Robotic processes may be implemented by a robot when one or more processors associated with the robot execute underlying software (e.g., instruction sets) associated with the robotic process. However, existing debugging techniques may be unsuitable for users who wish to debug robotic processes at a relatively high level.

SUMMARY

The present disclosure is generally directed to methods, apparatus, and computer-readable media (transitory and non-transitory) for providing tools to visually debug robotic processes at a relatively high level. Rather than utilizing traditional debugging techniques (e.g., setting breakpoints, artificially populating variables, periodically outputting variable values, etc.) on the software that underlies the robotic process, techniques described herein enable a user to operate a graphical user interface to debug the robotic process. In some implementations, a graphical user interface configured with selected aspects of the present disclosure may provide a visual flowchart that represents the logical flow of a robotic process. "Robot operation data" indicative of past robot implementations of the robotic process (e.g., from robot operation log files) or simulated hypothetical robot implementations of the robotic process may be determined and used to visually distinguish (e.g., emphasize) one or more graphical elements of the flowchart in various ways. This visual distinction may enable a user to efficiently identify various characteristics of how the robotic process is, or has been, implemented by a robot, such as how often the robot follows particular logical paths, how frequently errors are encountered by the robot when traversing a given logical path, and so forth. In some implementations, the flowchart may be comprised of graphical elements that are manipulable by a user to alter logic of the underlying software. This may enable a user to rearrange and test different logical paths, e.g., for debugging purposes.

In some implementations, a computer implemented method may be provided that includes the steps of: rendering, as part of a graphical user interface, a flowchart representing a robotic process, wherein a plurality of different logical paths through the robotic process are represented by a plurality of different visible paths through the flowchart; determining robot operation data indicative of one or more implementations of the robotic process; identifying, based on the robot operation data, a first logical path through the robotic process that satisfies a criterion; selecting, a first visual path through the flowchart that corresponds to the identified first logical path; and visually distinguishing, the first visible path through the flowchart from a second visible path through the flowchart.

This method and other implementations of technology disclosed herein may each optionally include one or more of the following features.

In various implementations, the robot operation data is indicative of at least one simulated implementation of the robotic process and/or at least one actual implementation of the robotic process by a robot. In various implementations, the criterion may be satisfied by detection of an error during traversal of the first logical path. In various implementations, the criterion may be satisfied by occurrence of an undesired result during, or as a consequence of, traversal of the first logical path.

In various implementations, the method may further include determining, based on the robot operation data, a first statistic associated with the first logical path through the robotic process. In various implementations, the visually distinguishing may include rendering one or more graphical elements of the first visible path through the flowchart with a first visual characteristic selected based on the first statistic. In various implementations, the method may further include determining, based on the robot operation data, a second statistic associated with a second logical path through the robotic process. In various implementations, the visually distinguishing may include rendering one or more graphical elements of the second visible path through the flowchart with a second visual characteristic selected based on the second statistic. In various implementations, the second visual characteristic may be different than the first visual characteristic. In various implementations, the first statistic may be an error frequency associated with the first logical path and/or a traversal frequency associated with the first logical path.

In various implementations, the method may further include receiving, via the graphical user interface, a user indication of a time interval, wherein determining the robot operation data comprises determining robot operation data indicative of one or more implementations of the robotic process during the time interval. In various implementations, rendering the flowchart may include rendering the flowchart along a robotic process timeline.

In various implementations, the flowchart may be a first flowchart, the robotic process may be a first robotic process, the robot operation data may be first robot operation data, and the method may further include: rendering, as part of the graphical user interface, along the robotic process timeline, a second flowchart representing a second robotic process, wherein a plurality of different visible paths through the second flowchart represent a plurality of different logical paths through the second robotic process; determining second robot operation data indicative of one or more implementations of the second robotic process; identifying, based on the second robot operation data, a first logical path through the second robotic process that satisfies a criterion; selecting, a first visual path through the second flowchart that corresponds to the first logical path through the second robotic process; and visually distinguishing the first visible path through the second flowchart from a second visible path through the second flowchart.

In various implementations, the visually distinguishing may include sequentially visually distinguishing, in a manner that tracks implementation of the robotic process along the robotic process timeline, a plurality of graphical elements of the first visible path through the flowchart. In various implementations, the method may further include:

rendering, as part of the graphical user interface, an avatar to represent a robot; and animating the avatar to simulate implementation of the robotic process by the avatar, wherein animation of the avatar coincides with sequentially visually distinguishing the plurality of graphical elements of the first visible path.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
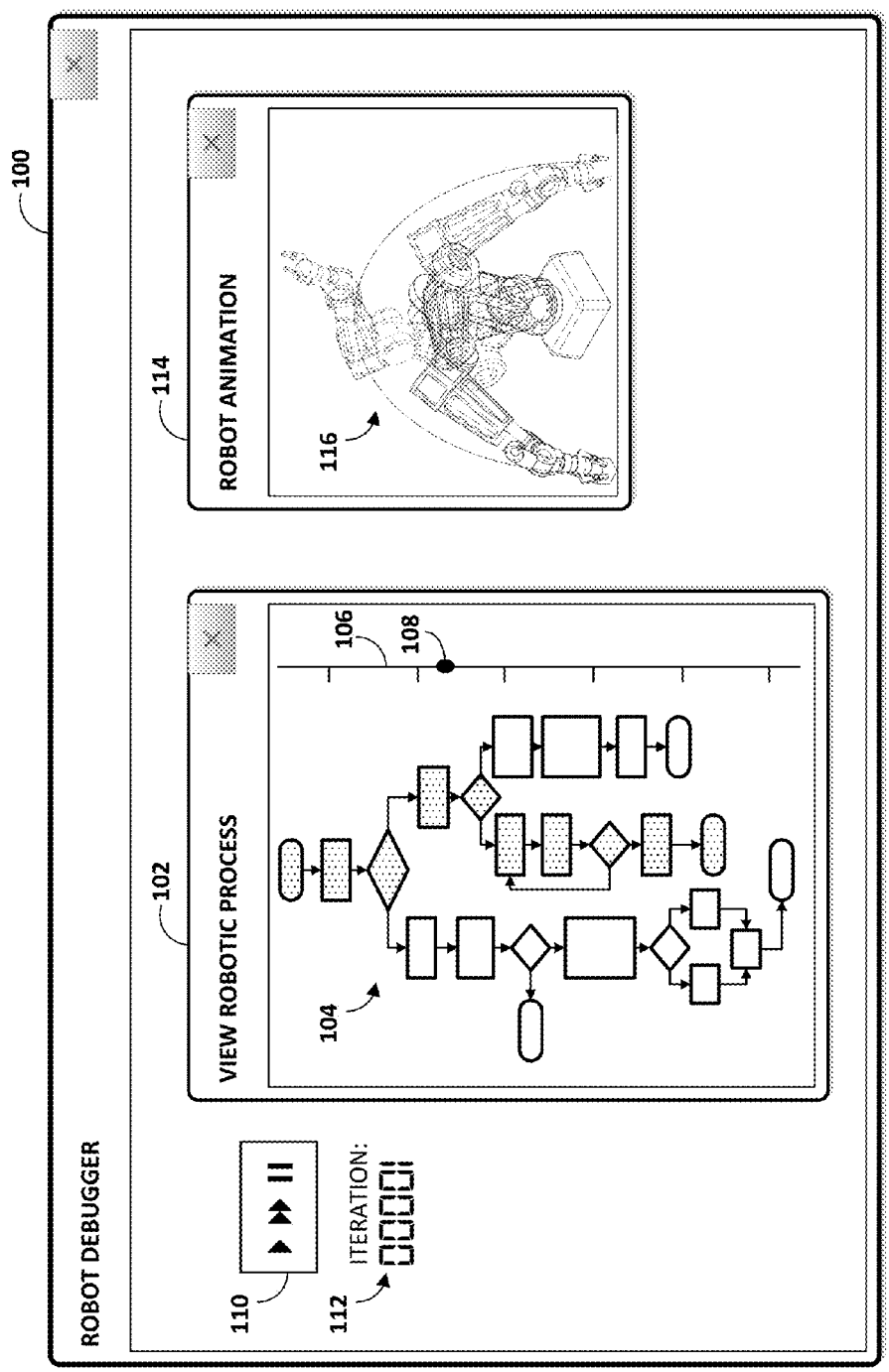
FIG. 1 depicts an example graphical user interface for visually debugging a robotic process, in accordance with various implementations.

FIG. 1 depicts an example graphical user interface 100 that may be operated by a user to debug a robotic process, in accordance with various implementations. Graphical user interface 100 may include, e.g., as a first dialog 102, a rendition of a flowchart 104 that represents a robotic process. As used herein, a "robotic process" comprises a set of instructions that are executable by a robot to perform one or more tasks. These instructions may be implemented in any combination of software (e.g., instructions stored in memory and executable by a processor) and hardware (e.g., FPGA, ASIC, etc.). A plurality of different logical paths may be taken by a robot through a robotic process, depending on various events, decision outcomes (e.g., conditionals), dynamic characteristics of an environment in which a robot operates, and so forth. These multiple logical paths may be represented in various implementations by a plurality of different visible paths through flowchart 104. First dialog 102 also includes a timeline 106 with a slider 108 that is movable along timeline 106 in response to various stimuli, such as a user dragging slider 108 along timeline 106, or the passage of time that occurs during implementation of a robotic process.

Graphical user interface 100 may further include controls 110 and a robotic process implementation iteration counter 112. Controls 110 may include various graphical elements (e.g., a "play" button, a "pause" button, a "fast forward" button, a "rewind" button) that may be operable by a user to simulate implementation of a robotic process by a robot. Implementations iteration counter 112 may indicate a number of times a robotic process has been implemented, and/or may be used to identify which implementation of a plurality of consecutive implementations of the robotic process is being demonstrated.

In some implementations, graphical user interface 100 may include, e.g., as a second dialog 114, a rendered avatar 116 that represents a robot of interest. In various implementations, avatar 116 may be animated to simulate implementation of the robotic process by the avatar. In some implementations, avatar 116 may be animated within a rendered multi-dimensional scene that mimics a real environment in which a robot operates (e.g., includes the same objects and/obstacles). In some implementations, animation of avatar 116 may coincide with sequential visual distinction of graphical elements of flowchart 104. In this example, avatar 116 resembles a robot arm, but this is not meant to be limiting. Avatar 116 may resemble any robot that is capable of implementing, and/or has implemented, a robotic process represented by flowchart 104. For example, avatar 116 may take the form of a humanoid, animal, insect, aquatic creature, wheeled device, submersible vehicle, unmanned aerial vehicle ("UAV"), and so forth.

In various implementations, robot operation data indicative of one or more actual or simulated implementations of the robotic process represented by flowchart 104 may be used to visually distinguish one or more visible paths through flowchart 104 from other visual paths. This visual distinction may aide in debugging or otherwise improving the robotic process in various ways. For example, a logical path through the robotic process that satisfies various criteria may be selected. A visual path that represents the selected logical path may then be visually distinguished, e.g., using various visual characteristics, such as color, highlighting, bolding, animation, etc., so that it may be readily identified by the user. Examples of how visual paths through flowchart 104 may be visually distinguished are shown in FIGS. 2-6.

FIGS. 2-5 depict the "VIEW ROBOTIC PROCESS" dialog 102 in more detail. In these examples, controls 110 and implementation iteration counter 112 are included as part of first dialog 102, rather than as standalone elements of a larger graphical user interface (e.g., 100). However, this is not meant to be limiting, and one or more of controls 110 and/or implementation iteration counter 112 may be rendered elsewhere. Flowchart 104 in these examples is depicted as being comprised of a plurality of graphical elements A-X connected by a plurality of edges to form a directed graph. However, this is not meant to be limiting, and other types and styles of flowcharts (e.g., state transition charts) may be rendered to represent a robotic process instead.

The rectangular-shaped graphical elements of flowchart 104 (e.g., B, D, E, etc.) may represent operations or actions (e.g., "move," "grab," "release," etc.) performable by a robot during implementation of the robotic process. In some implementations, each rectangular graphical element may represent a so-called "motion primitive," which may be a generic action performable by a robot. In some instances, a motion primitive may be associated with one or more input parameters that may be provided to dictate how the motion primitive is performed. For example, a motion primitive of "move" may have input parameters such as "velocity," "compliance," "distance," and so forth. The rhombus-shaped graphical elements (e.g., C, F, I, O, etc.) may represent decision points that correspond to, for instance, conditional logic (e.g., if/else statements) present in the robotic process.

Figure 2:
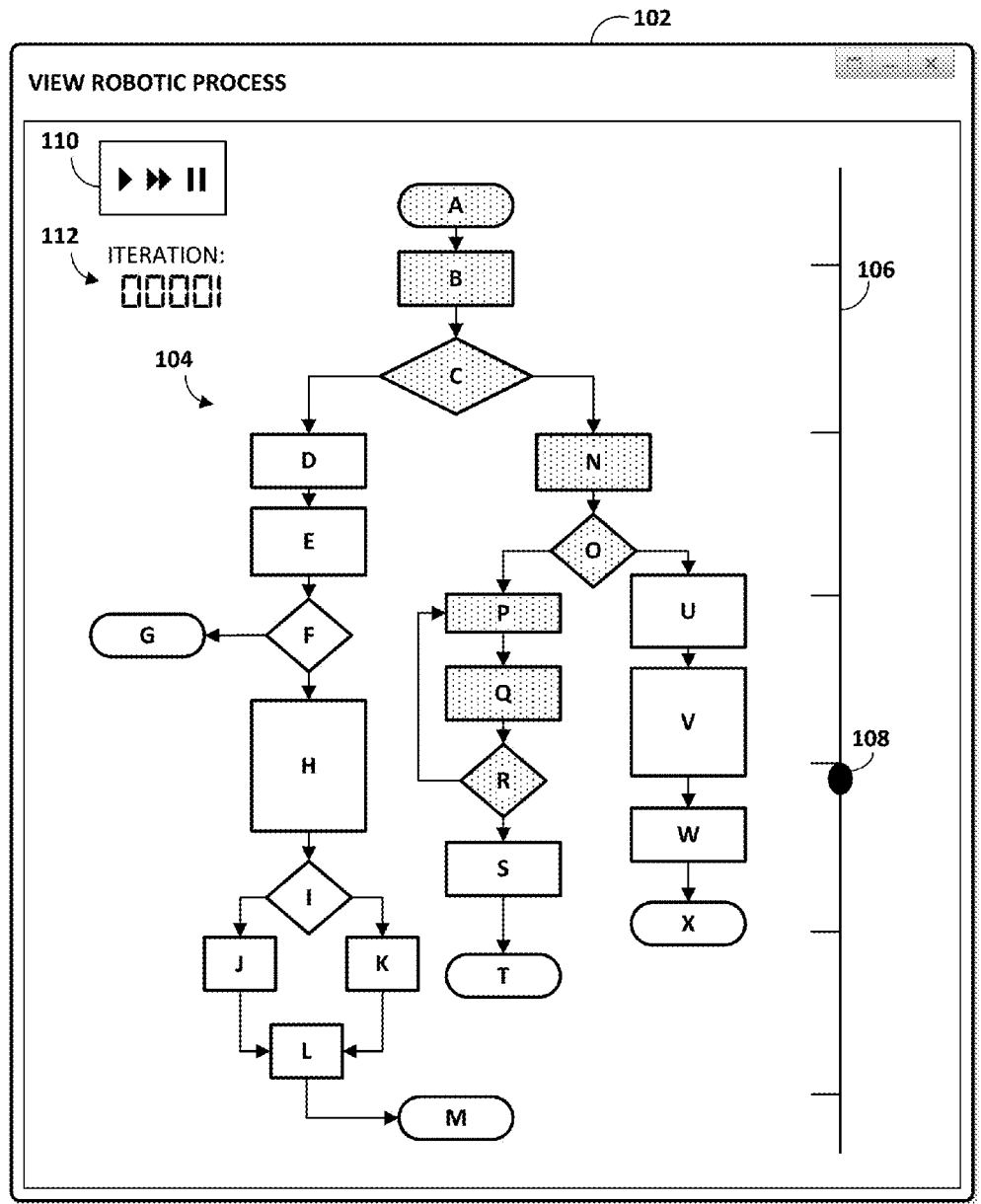
FIGS. 2-5 depict an example "VIEW ROBOTIC PROCESS" dialog that may be provided to a user, in accordance with various implementations.

In FIG. 2, implementation iteration counter 112 is set to "00001" to indicate that the robotic process represented by flowchart 104 has been implemented a single time. A single visual path, A-B-C-N-O-P-Q-R, which corresponds to a logical path taken through the underlying robotic process during the single iteration of the robotic process, has been visually distinguished. Other visual paths through flowchart 104 that correspond to other logical paths through the robotic process that have not yet been traversed, such as A-B-C-D-E-F-H-I-J (or K)-L-M, are not visually distinguished.

In some implementations, the graphical elements of the path A-B-C-N-O-P-Q-R may be visually distinguished sequentially, e.g., in a manner that tracks implementation of the robotic process temporally along timeline 106. For example, slider 108 is at a position along timeline 106 that indicates temporally where simulated implementation of the robotic process (which may have been initiated by pressing the "play" or "FF" buttons of controls 110) currently stands. In some implementations, avatar 116 (see FIG. 1) may be animated to simulate implementation of the robotic process by avatar 116, e.g., such that the animation coincides with sequential visual distinction of graphical elements of flowchart 104.

In some implementations, multiple flowcharts representing robotic processes may be rendered simultaneously in a dialog such as dialog 102. These multiple flowcharts may represent, for instance, simultaneous implementation by multiple robots (actual or simulated) of one or more robotic processes. Suppose a first robot is configured to implement a first robotic process. A second robot may be configured to implement a second robotic process that will cause the second robot to interact with the first robot while the first robot implements the first robotic process (e.g., the second robot may pass an object to the first robot). In such a scenario, it may be helpful for a technician to see, simultaneously, how both robots will implement their respective robotic process. As described above, the technician may be able to press "play" (or another similar control element) to cause the two robots to simulate implementation of the robotic processes simultaneously. Graphical elements of both flowcharts that represent logical paths traversed by the robots may be visually distinguished sequentially in a manner that tracks implementation of the robotic processes temporally along timeline. In some implementations, two avatars may be animated in the same or a different dialog to simulate implementation of the robotic processes by the two avatars, e.g., such that the animation coincides with sequential visual distinction of graphical elements of the two flowcharts.

Figure 3:
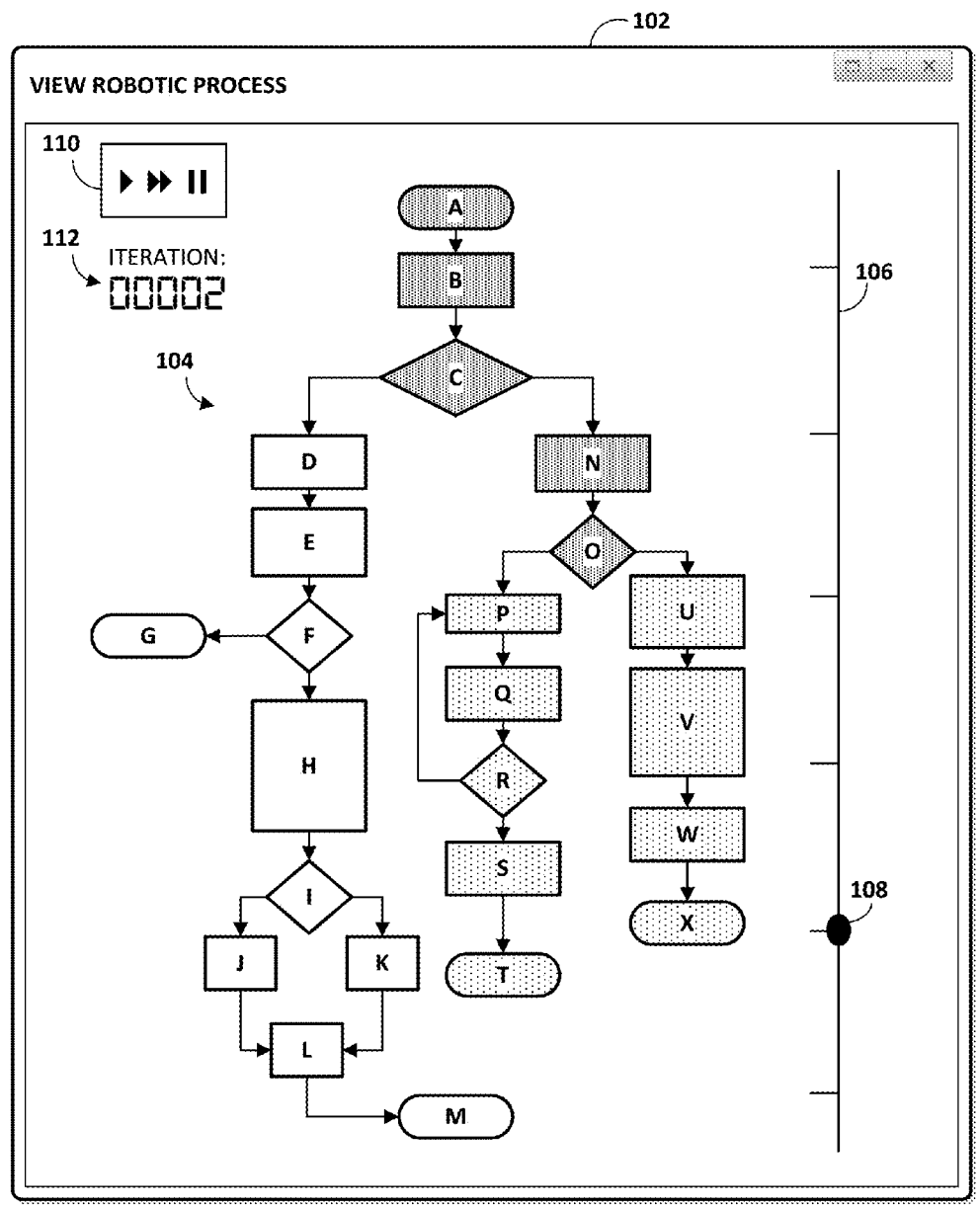

In FIG. 3, implementation iteration counter 112 is set to "00002" to indicate that the robotic process represented by flowchart 104 has been implemented twice. Multiple visual paths through flowchart 104 that correspond to multiple logical paths taken through the underlying robotic process during the two iterations have been visually distinguished. For example, paths A-B-C-N-O-P-Q-R-S-T and A-B-C-N-O-U-V-W-X are both visually distinguished to at least some degree. A different visual characteristic (e.g., a darker color) may be used to visually distinguish graphical elements of a sub-path, A-B-C-N-O, that is shared by these two paths because the shared sub-path has been traversed twice, whereas the two "tail" paths (i.e. P-Q-R-S-T and U-V-W-X) have only been traversed once each.

Figure 4:
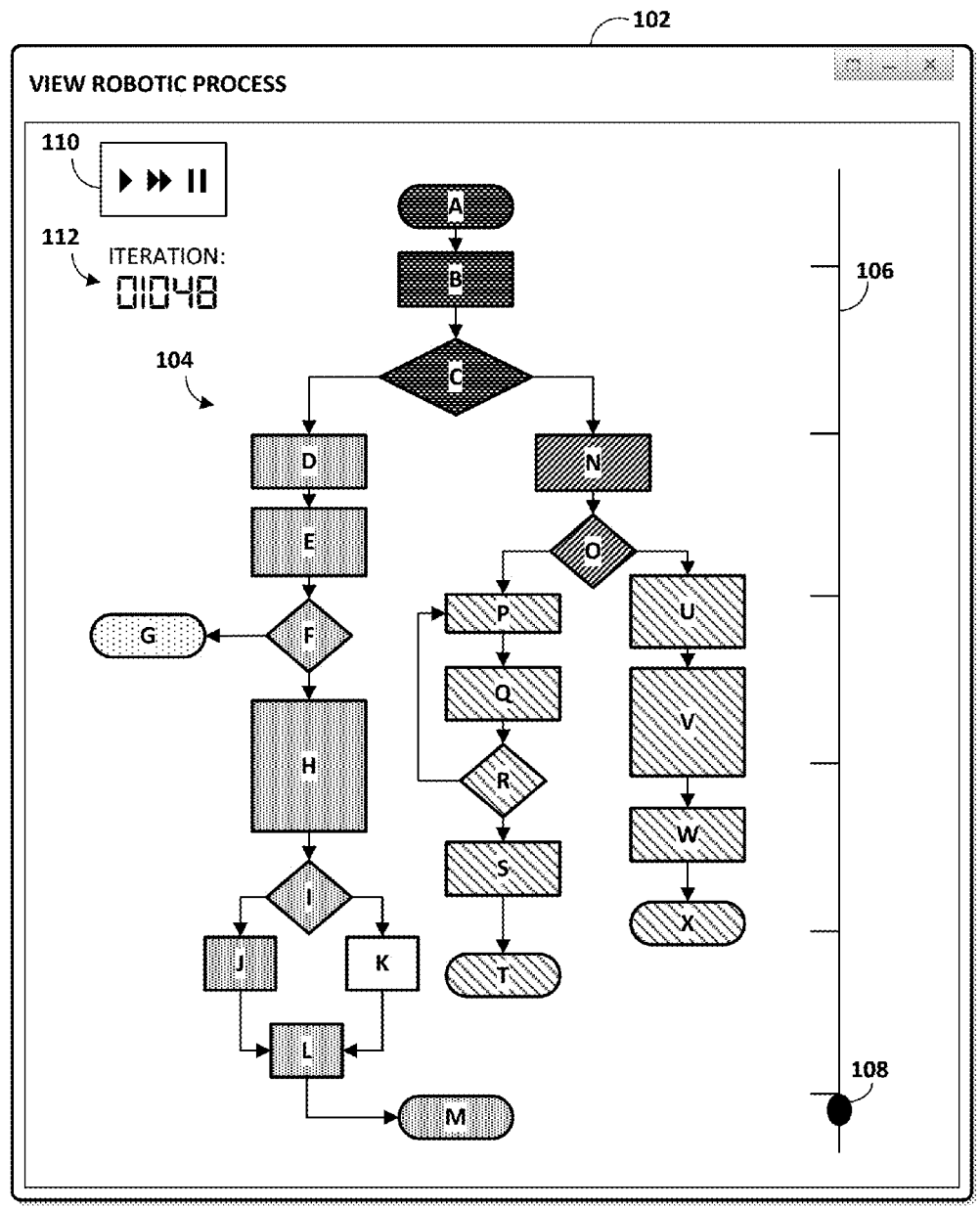

In FIG. 4, implementation iteration counter 112 is set to "01048" to indicate that the robotic process represented by flowchart 104 has been implemented one thousand forty eight times. Multiple visual paths through flowchart 104 that correspond to multiple logical paths taken through the underlying robotic process during the one thousand forty eight iterations have been visually distinguished with different visual characteristics that are selected based on statistics associated with each of the multiple logical paths. For example, "tail" paths P-Q-R-S-T and U-V-W-X are both visually distinguished with the same visual characteristic to indicate that during the one thousand forty eight iterations of the robotic process, those sub-paths were traversed a same or similar number of times (e.g., both fall within the same range of iterations). A different visual characteristic (e.g., a very dark color) may be used to visually distinguish graphical elements of a shared upstream path, N-O. Visual path A-B-C is always traversed (unless there is an error), and so it is visually distinguished with a highly conspicuous visual characteristic selected to indicate as much. The visual path D-E-F-H-I-J-K is visually distinguished from the other visual paths using yet another selected visual characteristic, e.g., to indicate that this path has been traversed a different number of times than the other paths. Element K is not visually distinguished at all, perhaps because it has never been traversed, which may suggest that a condition set forth at graphical element I is never (or always) satisfied.

A variety of visual characteristics may be selected for use in visually distinguishing a visual path. In some implementations, a gradient of colors and/or tints may be employed. For example, visual paths that are traversed the least may be visually distinguished using a color or tint from one end of the gradient (e.g., white). Visual paths that are traversed the most (e.g., A-B-C in FIG. 4) may be visually distinguished using a color or tint from the opposite end of the gradient (e.g., black, gray, red, etc.). Visual paths that are traversed intermediate numbers of times may be colored with corresponding intermediate colors or tints of the gradient. In this manner, flowchart 104, when visually distinguished, may come to resemble a heat map. In other implementations, sequences of graphical elements and/or edges connecting them to form visual paths may be visually distinguished using other techniques than colors or tints. These techniques may include but are not limited to enlargement, animation (e.g., blinking, sequential coloring), highlighting, changing of a font used in graphical elements, and so forth.

In addition to or instead of visually distinguishing visual paths, in various implementations, during animation of avatar 116 (see FIG. 1), one or more components of avatar 116 may be visually distinguished from other components of avatar 116, and/or may be visually distinguished in a manner that corresponds to how visual paths of flowchart 104 are visually distinguished. For example, suppose a user "plays" a simulation of a robot performing a robotic process. A rendered flowchart (e.g., 104) that corresponds to the robotic process may be visually traversed in real time as the individual actions are being performed by the robot (in reality or simulation). Individual graphical elements of the flowchart may be rendered with a particular visual characteristic that is selected based on various signals, such as which robot component is performing the action that corresponds to the graphical element, or a sensor value (e.g., depth camera, temperature, etc.). For example, actions performed by a first robot joint may be rendered in green and actions performed by a second robot joint may be rendered in blue. At the same time, the first robot joint on avatar 116 may be rendered/animated in green, and the second robot joint may be rendered/animated in blue. This may enable a user to more easily discern which portions of flowchart (and the underlying robotic process) are being performed by which joints or other operational components of the robot. In some implementations, a user may be able to select visual paths of flowchart 104, and "ghost" avatar images may be rendered (in addition to or instead of avatar 116) to demonstrate what avatar 116 would do if the selected visual path is followed. For example, a user could toggle through actions of flowchart 104, and a ghosted version of avatar 116 may be rendered to show what avatar 116 would look like at each action of flowchart 104.

In various implementations, users may be able to interact with various graphical elements of the dialogs depicted in the figures to review other aspects of robotic process implementation. Referring back to FIG. 4, graphical element G is colored very lightly, perhaps because it has only been reached a relatively small number of times, e.g., once, during the one thousand forty eight iterations of the robotic process. In various implementations, a user may operate a mouse or other similar device to select graphical element G. In some implementations, this may cause the dialog 102 to transition to a state depicted in FIG. 5, where a cursor 530 has been used to select graphical element G.

Figure 5:
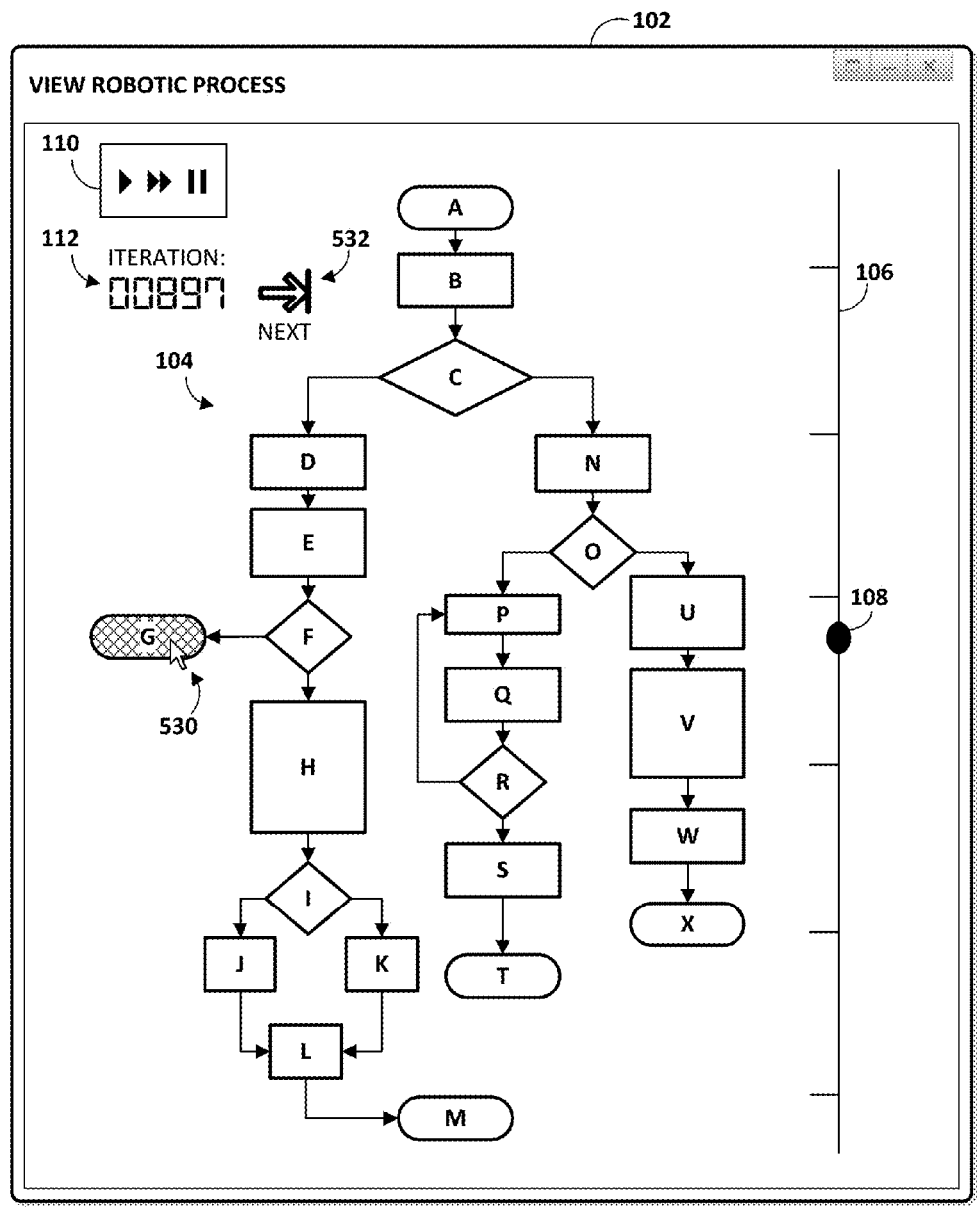
Figure 6:
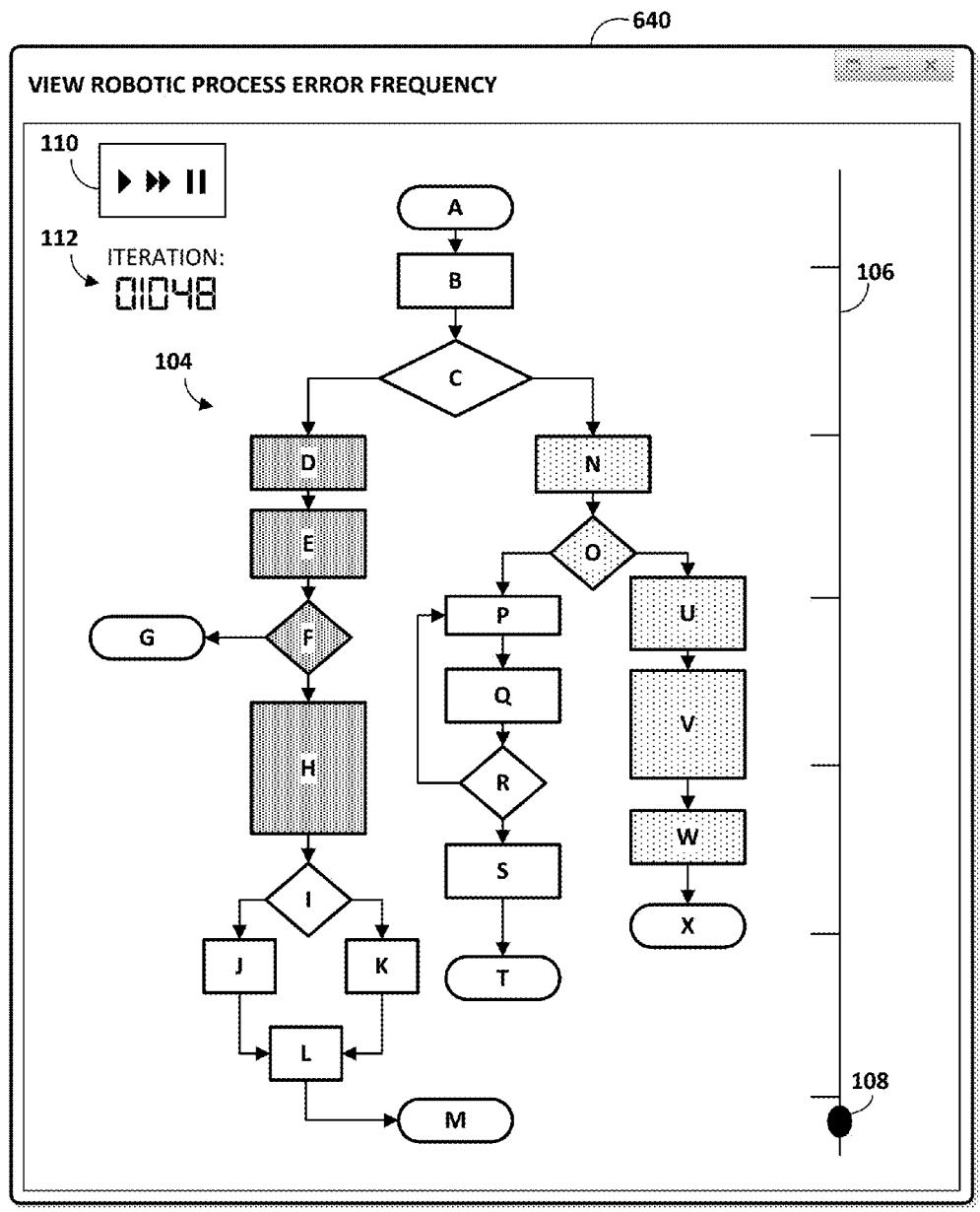
FIG. 6 depicts an example "VIEW ROBOTIC PROCESS ERROR FREQUENCY" dialog that may be provided to a user, in accordance with various implementations.

In FIG. 5, implementation iteration counter 112 has been set to 00897. This may indicate that graphical element G was reached during the eight hundred and ninety seventh iteration of the robotic process. In some implementations, if there were multiple iterations during which element G was reached, including that depicted in FIG. 5, a graphical element 532 may be provided to enable a user to toggle through multiple iterations of the robotic process during which graphical element G was reached. While visual distinction is removed from other graphical elements in FIG. 5, this is not required. In some implementations, the other graphical elements may be visually distinguished in a manner commensurate with how many times they had been traversed during the currently-displayed iteration.

Thus, for example, a user may be able to select a graphical element (e.g., G) to see iterations during which that graphical element was reached, and may also be able to see how often other graphical elements had been reached at that same iteration. Suppose graphical element G was reached during iterations 00897, 00904, and 01003. A user may be able to select graphical element G (e.g., using cursor 530 or by operating a touch screen of a smart phone or tablet) and toggle through iterations 00897, 00904, and 01003 using graphical element 532. When the user toggles through each iteration, the "heat map" shown by the other graphical elements may change to reflect how frequently logical paths of the underlying robotic process were traversed.

In addition to or instead of raw number of traversals of each visual path, in some implementations, visual paths of flowchart 104 may be selectively visually distinguished based on other path traversal statistics. For example, a frequency at which a particular logical path is traversed, e.g., relative to other visual paths and/or relative to a total number of iterations, may also be considered. Other traversal statistics may be used to selectively visually distinguish visual paths through flowchart 104 as well, including but not limited to raw count/frequency of good/bad/neutral outcomes, cumulative power consumed by a robot over a plurality of traversals of a visual path, other costs experienced by a robot or generally over a plurality of traversals of a visual path (e.g., wear and tear on robot), profits made over a plurality of traversals of a visual path, increases/decreases in inventory shrinkage experienced over a plurality of traversals of a visual path, and so forth.

Graphical elements of flowchart 104 may be visually distinguished based on other statistics as well. For example, in FIG. 6, a "VIEW ROBOT PROCESS ERROR FREQUENCY" dialog 640 is depicted in which visual paths in flowchart 104 are visually distinguished to reflect how frequently errors occurred while corresponding logical paths of the robotic process were traversed. In this example, path N-O-U-V-W is visually distinguished with one visual characteristic (e.g., a relatively light tint, or perhaps a particular color, such as yellow) to reflect that errors occurred during a relatively small fraction of traversals of the corresponding logical path of the robotic process. Path D-E-F-H is visually distinguished with another visual characteristic (e.g., a relatively dark tint, or a color such as red) to reflect that errors occurred during a relatively large fraction of traversals of the corresponding logical path of the robotic process. Other visual paths in FIG. 6 (e.g., A-B-C, P-Q-R-S-T) are not visually distinguished, perhaps to reflect that no errors were encountered during traversal of corresponding logical paths of the robotic process.

In addition to or instead of error frequency, in some implementations, visual paths of flowchart 104 may be selectively visually distinguished based on other error statistics, such as raw number of errors encountered during traversal of the visual path, severity of errors encountered during traversal of the visual path, type of errors encountered during traversal of the visual path, and so forth. Furthermore, and similar to FIG. 5, in some implementations, a user may be able to select one or more of the visually distinguished paths of flowchart 104 in FIG. 6 to identify and/or toggle through iterations of the robotic process during which errors occurred.

In various implementations, as part of the debugging process, a user may be able to simulate robot performance of a robotic process under a variety of hypothetical circumstances. For example, a user may set various parameters to various values (i.e., "mock" data), and then simulate robot performance using those parameter values to observe the robot's performance and make appropriate adjustments (e.g., altering impedance, velocity, etc.). Suppose part of a robot process causes a robot to pick up an object from a first location and drop it off at a second location. The user may set a mass and/or size of the object to various values to see how the robot is able to perform the robotic process under those circumstances. For example, a user could repeatedly alter a weight of the object and rerun the robotic process to see how the robot's performance of the robotic process is affected. In some implementations, this repeated adjustment of one or more parameters may be performed automatically, e.g., to find a viable solution to a problem. For example, if a robot tends to drop a particular object, the robotic process could be implemented repeatedly with parameter values (e.g., gripper strength, robot velocity, etc.) being incremented until the robot no longer drops the object.

While the flowchart 104 depicted in FIGS. 1-6 was described as representing a general robotic process that included, for example, user-programmed actions to be performed by a robot under normal operation, this is not meant to be limiting. In various implementations, similar flowcharts may be rendered that represent other types or robotic processes, such as error routines. In various implementations, an error routine may be, for instance, a default sequence of one or more actions that the robot may perform in the event of an error. For example, one or more individual actions represented in a flow chart may have one or more associated error conditions such as collisions, kinematic violations, joint space translation errors, and so forth, for which corresponding error routines may be defined. The error routines, when performed by the robot, may cause the robot to perform a variety of actions depending on the error (e.g., stop if a collision is detected; attempt to pick up dropped object, etc.). The actions forming error routines may be, in various implementations, defined be default, and/or may be user-defined (e.g., user overridden).

In various implementations, a user may be able to debug an error routine much in the same way the user is able to debug normal robotic processes as described above. For example, the user may be able to view a flow chart representing the error routine with one or more visual paths visually distinguished from other visual paths (e.g., path traveled is colored differently than non-travelled path). Additionally, a user may be able to set various parameters to various values (e.g., the robot is carrying an object of a certain size and/or mass, the robot is travelling at a particular velocity, is in a particular joint configuration, is at a particular point in performing a robotic process, etc.) when an error routine is triggered, to see how the robot would perform the error routine under various circumstances.

Figure 7:
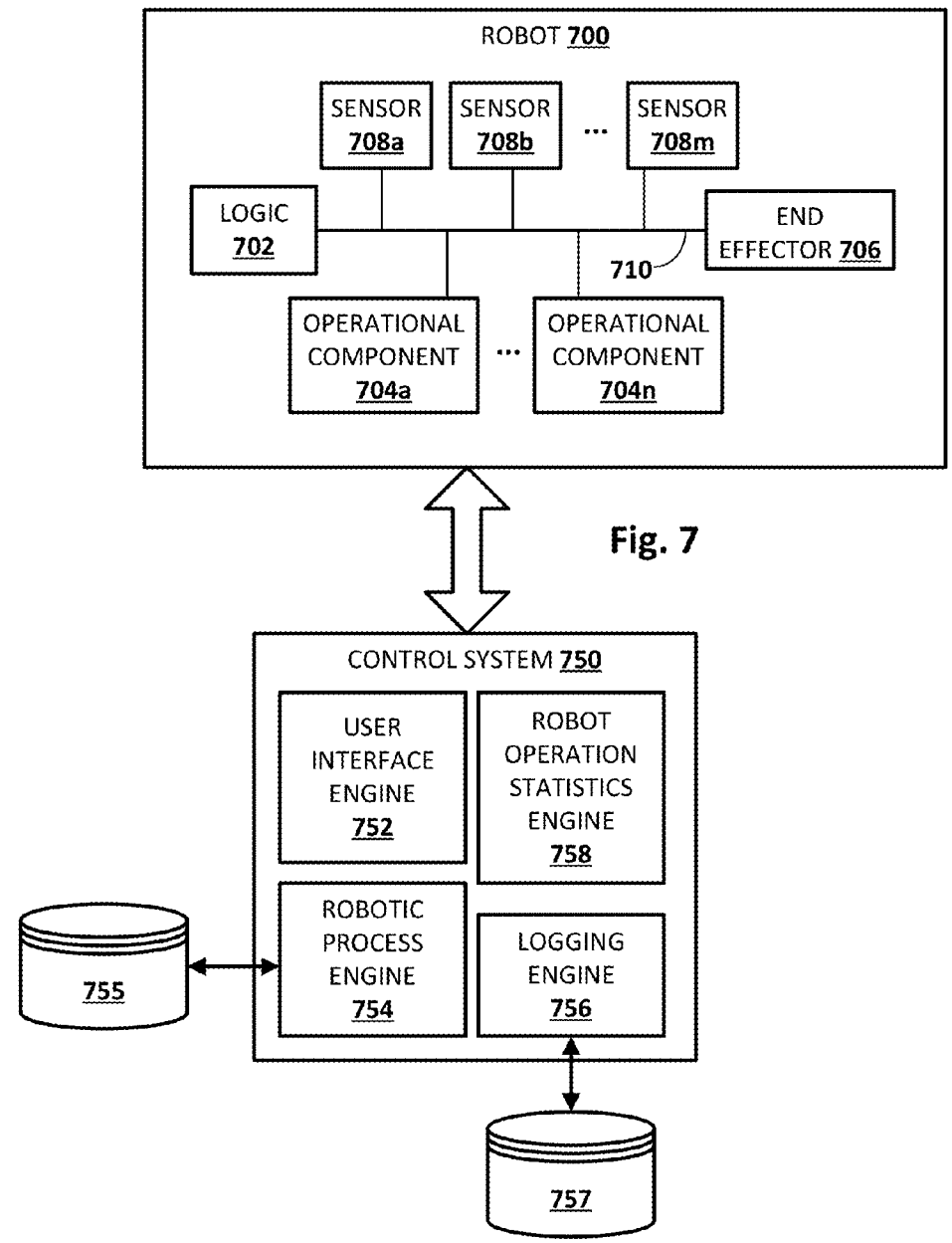
FIG. 7 schematically depicts an example environment in which disclosed techniques may be employed, in accordance with various implementations.

FIG. 7 is a schematic diagram of an example environment in which selected aspects of the present disclosure may be implemented in accordance with various implementations. A robot 700 may be in communication with a control system 750. As noted above, robot 700 may take various forms, including but not limited to a robot arm, a humanoid, an animal, an insect, an aquatic creature, a wheeled device, a submersible vehicle, a UAV, and so forth. In various implementations, robot 700 may include logic 702. Logic 702 may take various forms, such as one or more processors, one or more field-programmable gate arrays ("FPGA"), one or more application-specific integrated circuits ("ASIC"), one or more so-called "real time controllers," and so forth. In various implementations, logic 702 may be operably coupled with one or more operational components 704a-n, one or more end effectors 706, and/or one or more sensors 708a-m, e.g., via one or more buses 710.

As used herein, "operational components" 704 of a robot may refer to actuators, motors (e.g., servo motors), joints, shafts, gear trains, pumps (e.g., air or liquid), pistons, drives, or other components that may create and/or undergo propulsion, rotation, and/or motion. Some operational components such as many joints may be independently controllable, although this is not required. In some instances, the more operational components robot 700 has, the more degrees of freedom of movement it may have.

As used herein, "end effector" 706 may refer to a variety of tools that may be operated by robot 700 in order to accomplish various tasks. For example, some robots may be equipped with an end effector 706 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 706 may be removable, and various types of modular end effectors may be installed onto robot 700, depending on the circumstances.

Sensors 708 may take various forms, including but not limited to light sensors (e.g., passive infrared), pressure sensors, pressure wave sensors (e.g., microphones), proximity sensors, torque sensors, radars, range finders, accelerometers, gyroscopes, compasses, position coordinate sensors (e.g., global positioning system, or "GPS"), speedometers, and so forth. While sensors 708a-m are depicted as being integral with robot 700, this is not meant to be limiting. In some implementations, sensors 708 may be located external to, but may be in direct or indirect communication with, robot 700, e.g., as standalone units or as part of control system 750.

Control system 750 may include one or computing systems connected by one or more networks (not depicted) that control operation of robot 700 to various degrees. An example of such a computing system is depicted schematically in FIG. 9. In some implementations, control system 750 exerts a relatively high level of control over robot 700, e.g., in real time in response to signals received by a user interface engine 752 and/or one or more readings from one or more sensors 708. In other implementations, control system 750 exerts less direct control over robot 700. For example, control system 750 may provide robot 700 with high level tasks and/or actions that form the tasks, data indicative of environmental constraints (e.g., obstacles to avoid), and/or other general constraints that robot 700 may be unable to ascertain itself by processing signals from sensors 708. Logic 702 on robot 700 may convert such high level tasks and actions into robot action, e.g., by translating one or more high level tasks and/or actions into a plurality of motion primitives executable by robot 700. Various modules or engines may be implemented as part of control system 750 as software, hardware, or any combination of the two. For example, in FIG. 7, control system 750 includes a user interface engine 752, a robotic process engine 754, a logging engine 756, and a robot operation statistics engine 758.

User interface engine 752 may be configured to enable user input of various commands or tasks for robot 700, and/or output of various data, e.g., to facilitate debugging as described herein. In some implementations, user interface engine 752 may provide data usable by a computing device (e.g., laptop, smart phone, workstation, desktop, tablet, etc.) to render the graphical user interface and/or dialogs presented in FIGS. 1-6. For example, user interface engine 752 may be configured to obtain, e.g., from robotic process engine 754, data indicative of one or robotic processes (e.g., instruction sets, motion primitives, etc.), and then render one or more flowcharts (e.g., 104) that represent the one or more robotic processes.

Robotic process engine 754 may be operably coupled with an index 755 that contains one or more instruction sets that are configured to cause robot 700 to perform one or more corresponding robotic processes. Robotic process engine 754 may provide data indicative of these one or more robotic processes to other components, such as user interface engine 752, logging engine 756, and/or robot operation statistics engine 758. In some implementations, user interface engine 752 may provide a graphical user interface that enables users to select one or more robotic processes to be simulated, e.g., for debugging purposes.

Logging engine 756 may be configured to monitor and store, e.g., in index 757, data indicative of real or simulated robot implementation of the one or more robotic processes stored in index 755. For example, while robot 700 performs a task, sensors 708*a-m* may output data at various frequencies. At least some of this output sensor data may be captured and logged by logging engine 756. Data that is logged by logging engine 756 is not limited to sensor data. In some implementations, other data pertaining to implementation by robot 700 of a robotic process may also be captured and logged, including but not limited to outcomes (e.g., positive and negative) of implementations of one or more robotic processes, occurrence of errors, occurrence of various user-defined events, and so forth.

Robot operation statistics engine 758 may be configured to determine robot operation data based on logging data provided by, for instance, logging engine 756, and then determine various statistics based on the robot operation data. Robot operation statistics engine 758 may determine robot operation data in various ways for various purposes. For example, in some implementations a user may operate a graphical user interface (e.g., provided by user interface engine 752) to provide a user indication of a time interval of interest and a robotic process of interest. Suppose a user wishes to analyze performance by robot 700 of a particular robot process during a particular time interval (e.g., of a particular day, or the same time interval over multiple days). In various implementations, robot operation statistics engine 758 may gather, e.g., from index 757 via logging engine 756, robot operation data indicative of one or more implementations of the particular robotic process by robot 700 during the user-provided time interval(s).

Robot operation statistics engine 758 may then determine various statistics based on the gathered robot operation data. For example, and as described above, robot operation statistics engine 758 may determine frequencies at which one or more logical paths of the robotic process were traversed during the time interval, a frequency at which errors occurred while various logical paths were traversed, and so forth. In various implementations, robot operation statistics engine 758 may provide data indicative of these statistics to other components, such as user interface engine 752, so that user interface engine 752 may update one or more rendered flowcharts with visual distinction selected based on the statistics.

While robot 700 and control system 750 are depicted separately in FIG. 7, this is not meant to be limiting. In various implementations, one or more aspects (e.g., modules, engines, etc.) depicted in FIG. 7 as implemented on one of robot 700 or control system 750 may be implemented on the other, may be distributed across both, and/or may be distributed across one or both in combination with other components not depicted in FIG. 7. In implementations where robot 700 and control system 750 are separate, they may communicate over one or more wired or wireless networks (not depicted) or using other wireless technology, such as radio, Bluetooth, infrared, etc. In other implementations, control system 750 may be implemented entirely or in part using logic 702 of robot 700.

Figure 8:
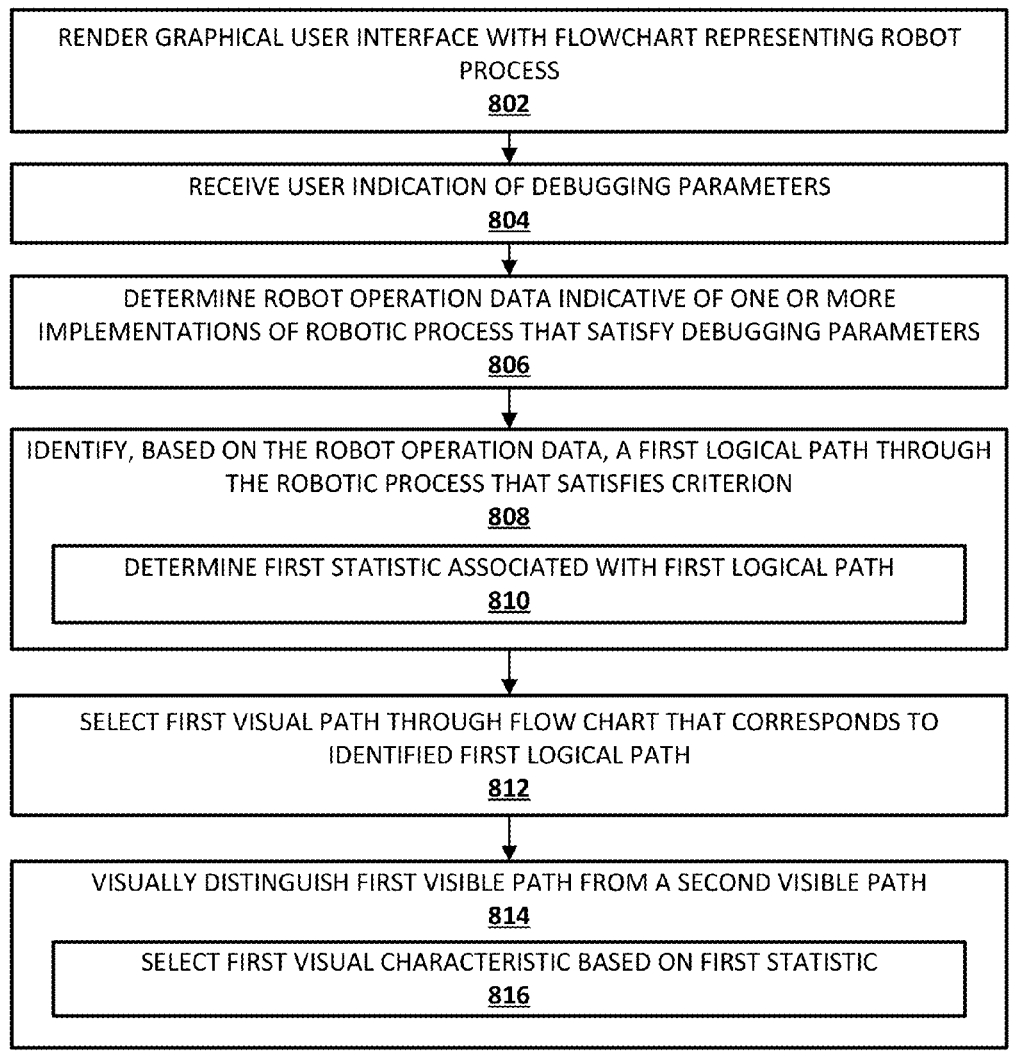
FIG. 8 depicts an example method for providing a graphical user interface for visually debugging a robotic process, in accordance with various implementations.

Referring now to FIG. 8, an example method 800 of visually debugging a robotic process is described. For convenience, the operations of flow charts are described with reference to a system that performs the operations. This system may include various components of various computer systems, including computing elements of robot 700 and/or control system 750. Moreover, while operations of method 800 are shown in a particular order, this is not meant to be limiting. One or more operations may be reordered, omitted or added.

At block 802, the system may render a graphical user interface that includes a flowchart (e.g., 104) that represents a robotic process. At block 804, the system may receive a user indication of one or more debugging parameters. For example the user may operate the graphical user interface rendered at block 802 to identify and/or select one or more robots that have implemented, or are capable of implementing, the robotic process, a time interval of interest, various input parameters for the robot process (if the user will be simulating runs of the robotic process), and so forth. A user may provide these parameters using various graphical elements, such as drop down menus, buttons, sliders, voice commands, text entry boxes, and so forth.

At block 806, the system may determine robot operation data that is indicative of one or more implementations of a robotic process that satisfy the debugging parameters received at block 804. For example, suppose a user requests robot operation data associated with a particular robot's implementation of the robotic process between 3-4 pm yesterday. The system may search one or more log files associated with that particular robot and its implementation of the robotic process, and may extract, as robotic operation data, log entries that occurred during that time interval.

At block 808, the system may identify, based on the robotic operation data determined at block 806, a first logical path through the robotic process that satisfies some criterion. In some implementations, this criterion may be as simple as "has been traversed at least once," or "at least one error detected during traversal." In some implementations, the criterion may be more complex. For example, at block 810, to determine whether the logical path satisfies a criterion, the system may determine a first statistic associated with the logical path, such as traversal count (e.g., how many times was the logical path traversed during the implementations of the robotic process under consideration?), traversal frequency (e.g., during what percentage of the total robotic process implementations was this particular logical path traversed?), error count (e.g., how many times did errors occur during traversal of this logical path?), error frequency (e.g., during what percentage of the traversals of this particular logical path traversed did errors occur?), undesired result count/frequency (e.g., how many times, or how frequently, did traversal of the path result in an undesirable result), and so forth.

At block 812, the system may select a first visual path through the flowchart rendered at block 802 that corresponds to the first logical path identified at block 808. At block 814, the system may visually distinguish the first visual path from a second visual path through the flowchart. For example, in some implementations, at block 816, the system may select a visual characteristic (e.g., color, tint, animation, highlighting, etc.) based on the statistic determined at block 810, and may visually distinguish the first visual path from the second visual path using that visual characteristic.

Figure 9:
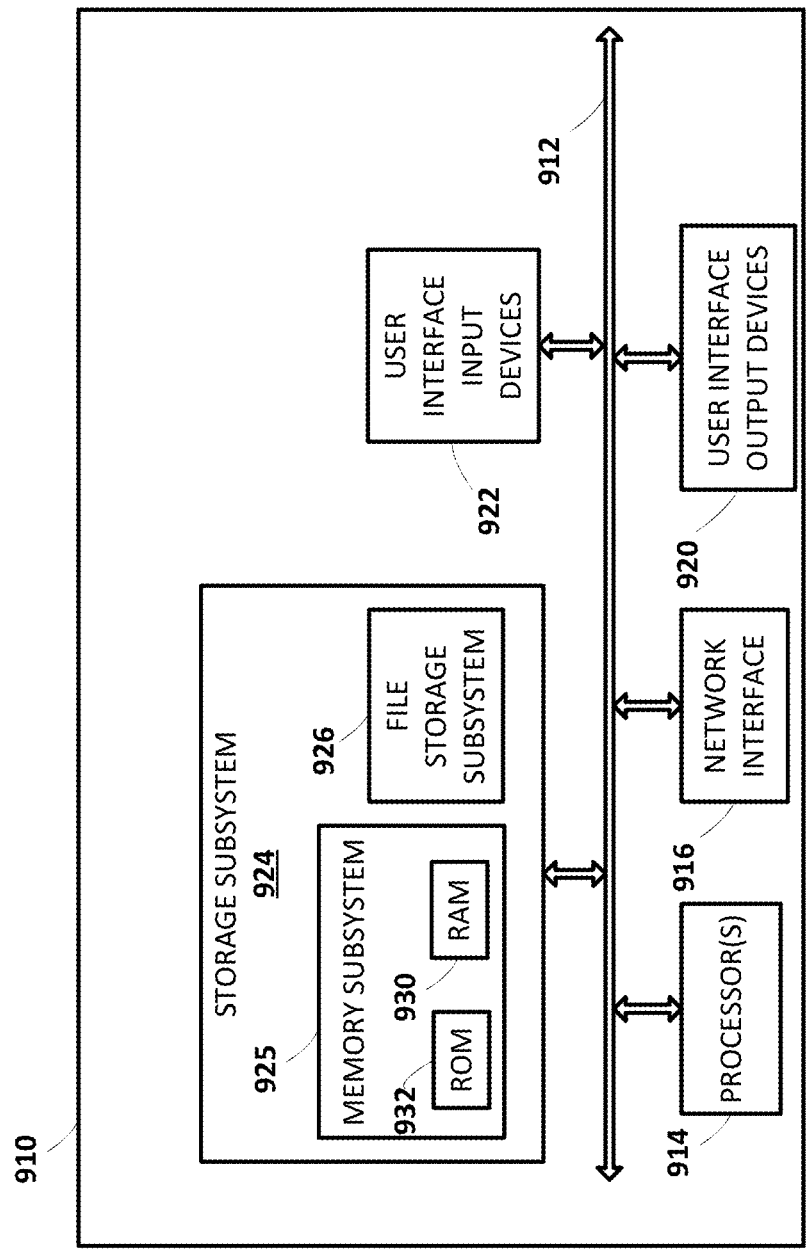
FIG. 9 schematically depicts an example architecture of a computer system.

FIG. 9 is a block diagram of an example computer system 910. Computer system 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computer system 910. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. For example, the storage subsystem 924 may include the logic to perform selected aspects of method 800, and/or to implement one or more aspects of logic 702, user interface engine 752, robotic process engine 754, logging engine 756, and/or robot operation statistics engine 752. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a CD-ROM drive, an optical drive, or removable media cartridges. Modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
    rendering, by one or more processors, as part of a graphical user interface, a flowchart representing a robotic process, wherein a plurality of different logical paths through the robotic process are represented by a plurality of different visible paths through the flowchart;
    rendering, by one or more of the processors, a robot process timeline that is visible simultaneously with the flowchart, wherein the robot process timeline represents a time interval associated with implementation of the robotic process;
    implementing, by one or more of the processors, the robotic process with a real or simulated robot to generate robot operation data indicative of implementation of the robotic process, wherein the implementing is performed in response to user selection of a graphical element of the graphical user interface;
    identifying, by one or more of the processors, based on the robot operation data, a first logical path through the robotic process that satisfies a criterion,
    selecting, by one or more of the processors, a first visual path through the flowchart that corresponds to the identified first logical path;
    determining, based on the robot operation data, a first statistic associated with the first logical path through the robotic process;
    visually distinguishing, by one or more of the processors, the first visible path through the flowchart from a second visible path through the flowchart, wherein the visually distinguishing comprises rendering one or more graphical elements of the first visible path through the flowchart with a first visual characteristic selected based on the first statistic and wherein the first statistic is based on a traversal frequency on the first logical path through the robotic process;
    sequentially rendering, by one or more of the processors, a graphical element at a plurality of positions along the robot process timeline in temporal synchronization with the implementation of the robotic process;
    rendering, by one or more of the processors, as part of the graphical user interface, an avatar to represent a robot; and
    animating, by one or more of the processors, as part of the graphical user interface, the avatar to simulate the implementation of the robotic process by the avatar, wherein animation of the avatar coincides with sequentially visually distinguishing the plurality of graphical elements of the first visible path.

2. The computer-implemented method of claim 1, wherein the criterion is satisfied by detection of an error during traversal of the first logical path.

3. The computer-implemented method of claim 1, wherein the criterion is satisfied by occurrence of an undesired result during, or as a consequence of, traversal of the first logical path.

4. The computer-implemented method of claim 1, further comprising determining, based on the robot operation data, a second statistic associated with a second logical path through the robotic process;
wherein the visually distinguishing comprises rendering one or more graphical elements of the second visible path through the flowchart with a second visual characteristic selected based on the second statistic; and
wherein the second visual characteristic is different than the first visual characteristic.

5. The computer-implemented method of claim 1, wherein
the first statistic is an error frequency associated with the first logical path.

6. The computer-implemented method of claim 1, further comprising receiving, by one or more of the processors via the graphical user interface, a user indication of the time interval, wherein determining the robot operation data comprises determining robot operation data indicative of one or more implementations of the robotic process during the time interval.

7. The computer-implemented method of claim 1, wherein
the flowchart is a first flowchart, the robotic process is a first robotic process, the robot operation data is first robot operation data, and the method further comprises:
rendering, by one or more of the processors, as part of the graphical user interface, along the robotic process timeline, a second flowchart representing a second robotic process, wherein a plurality of different visible paths through the second flowchart represent a plurality of different logical paths through the second robotic process;
implementing, by one or more of the processors, the robotic process with a real or simulated second robot to generate second robot operation data indicative of one or more implementations of the second robotic process;
identifying, by one or more of the processors, based on the second robot operation data, a first logical path through the second robotic process that satisfies a criterion;
selecting, by one or more of the processors, a first visual path through the second flowchart that corresponds to the first logical path through the second robotic process; and
visually distinguishing, by one or more of the processors, the first visible path through the second flowchart from a second visible path through the second flowchart.

8. The computer-implemented method of claim 1, wherein the visually distinguishing comprises sequentially visually distinguishing, in a manner that tracks the implementation of the robotic process along the robotic process timeline, the plurality of graphical elements of the first visible path through the flowchart.

9. At least one non-transitory computer-readable medium comprising instructions that, in response to execution of the instructions by a computing system, cause the computing system to perform the following operations:
rendering, as part of a graphical user interface, a flowchart representing a robotic process, wherein a plurality of different logical paths through the robotic process are represented by a plurality of different visible paths through the flowchart;
rendering, as part of the graphical user interface, a robot process timeline that is visible simultaneously with the flowchart, wherein the robot process timeline represents a time interval associated with implementation of the robotic process;
implementing the robotic process with a real or simulated robot to generate robot operation data indicative of implementation of the robotic process, wherein the implementing is performed in response to user selection of a graphical element of the graphical user interface;
identifying, based on the robot operation data, a first logical path through the robotic process that satisfies a criterion;
selecting a first visual path through the flowchart that corresponds to the identified first logical path;
determining, based on the robot operation data, a first statistic associated with the first logical path through the robotic process;
visually distinguishing the first visible path through the flowchart from a second visible path through the flowchart, wherein the visually distinguishing comprises rendering one or more graphical elements of the first visible path through the flowchart with a first visual characteristic selected based on the first statistic and wherein the first statistic is based on a traversal frequency on the first logical path through the robotic process;
sequentially rendering, as part of the graphical user interface, a graphical element at a plurality of positions along the robot process timeline in temporal synchronization with implementation of the robotic process;
rendering, as part of the graphical user interface that is visible simultaneously with the flowchart, an avatar that represents the real or simulated robot; and
animating, as part of the graphical user interface, the avatar to simulate the implementation of the robotic process by the avatar, wherein animation of the avatar is synchronized temporally with the implementing of the robotic process and the visually distinguishing of the first visible path through the flowchart.

10. The at least one non-transitory computer-readable medium of claim 9, wherein the rendering includes rendering, as part of the graphical user interface, one or more of a play button, a pause button, a rewind button, or a fast-forward button, wherein user selection of the play button causes the implementing, user selection of the pause button causes the implementing to be paused, user selection of the rewind button causes the implementing to be rewound, and user selection of the fast-forward button causes the implementing to be accelerated.

11. The at least one non-transitory computer-readable medium of claim 9, wherein the flow chart includes one or more nodes that are selectable to cause the implementing to initiate at a point in the robotic process that corresponds logically with the selected node.

12. A system comprising one or more processors and memory operably coupled with the one or more processors, wherein the memory stores instructions that, in response to execution of the instructions by one or more processors, cause the one or more processors to perform the following operations:
rendering, as part of a graphical user interface, a flowchart representing a robotic process, wherein a plurality of different logical paths through the robotic process are represented by a plurality of different visible paths through the flowchart;

rendering, as part of the graphical user interface, a robot process timeline that is visible simultaneously with the flowchart, wherein the robot process timeline represents a time interval associated with implementation of the robotic process;

implementing the robotic process with a real or simulated robot to generate robot operation data indicative of implementation of the robotic process, wherein the implementing is performed in response to user selection of a graphical element of the graphical user interface;

identifying, based on the robot operation data, a first logical path through the robotic process that satisfies a criterion;

selecting a first visual path through the flowchart that corresponds to the identified first logical path;

determining, based on the robot operation data, a first statistic associated with the first logical path through the robotic process;

visually distinguishing the first visible path through the flowchart from a second visible path through the flowchart, wherein the visually distinguishing comprises rendering one or more graphical elements of the first visible path through the flowchart with a first visual characteristic selected based on the first statistic and wherein the first statistic is based on a traversal frequency on the first logical path through the robotic process;

sequentially rendering a graphical element at a plurality of positions along the robot process timeline in temporal synchronization with the implementation of the robotic process;

rendering, as part of the graphical user interface, an avatar to represent a robot; and animating, as part of the graphical user interface, the avatar to simulate implementation of the robotic process by the avatar, wherein animation of the avatar coincides with sequentially visually distinguishing the plurality of graphical elements of the first visible path.

13. The system of claim 12, wherein the criterion is satisfied by detection of an error during traversal of the first logical path.

14. The system of claim 12, wherein the criterion is satisfied by occurrence of an undesired result during, or as a consequence of, traversal of the first logical path.

* * * * *